(12) United States Patent
Gapontsev et al.

(10) Patent No.: US 8,655,121 B2
(45) Date of Patent: Feb. 18, 2014

(54) SINGLE MODE HIGH POWER FIBER LASER SYSTEM

(75) Inventors: Valentin P Gapontsev, Worcester, MA (US); Nikolai Platonov, Worcester, MA (US); Valentin Fomin, Burbach (GE); Michael Vyatkin, Fryazino (RU)

(73) Assignee: IPG Photonics Corporation, Oxford, MA (US)

( * ) Notice: Subject to any disclaimer, the term of this patent is extended or adjusted under 35 U.S.C. 154(b) by 168 days.

(21) Appl. No.: 13/277,339

(22) Filed: Oct. 20, 2011

(65) Prior Publication Data

US 2012/0269209 A1    Oct. 25, 2012

Related U.S. Application Data

(63) Continuation of application No. 12/559,284, filed on Sep. 14, 2009, now Pat. No. 8,068,705.

(51) Int. Cl.
*G02B 6/26* (2006.01)
(52) U.S. Cl.
USPC ............................................................ 385/28

(58) Field of Classification Search
USPC ............................................................ 385/28
See application file for complete search history.

(56) References Cited

U.S. PATENT DOCUMENTS

| | | | |
|---|---|---|---|
| 5,074,633 A | 12/1991 | Cohen et al. | |
| 7,526,165 B2 * | 4/2009 | Nielsen et al. | 385/125 |
| 2005/0265653 A1 * | 12/2005 | Cai et al. | 385/28 |

* cited by examiner

*Primary Examiner* — Uyen Chau N Le
*Assistant Examiner* — Hoang Tran
(74) *Attorney, Agent, or Firm* — Yuri Kateshov; Timothy J. King

(57) ABSTRACT

A high power single mode fiber laser system has a monolithic active fiber configured with a double bottleneck-shaped multimode (MM) core which is capable of supporting substantially only a fundamental mode at a given wavelength. The core has opposite uniformly configured end regions, frusto-conical transformer regions running inwards from the respective end regions, and a central uniformly-dimensioned region which bridges the transformer regions. The MM core is configured with a refractive step-index profile which includes a continuous dip configured to shape an intensity field of the fundamental mode from a Gaussian or dome-shaped field profile to a two-peak-shaped profile and back to the Gaussian filed profile.

6 Claims, 2 Drawing Sheets

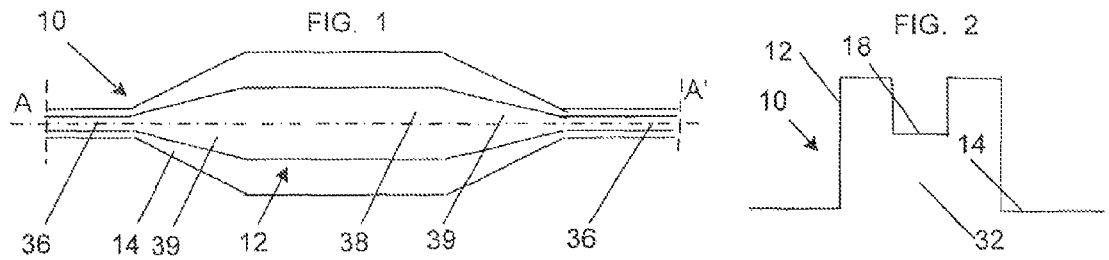
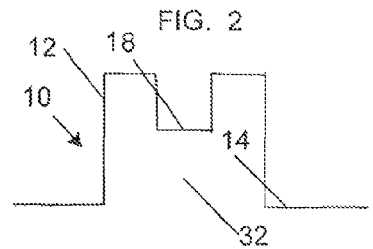
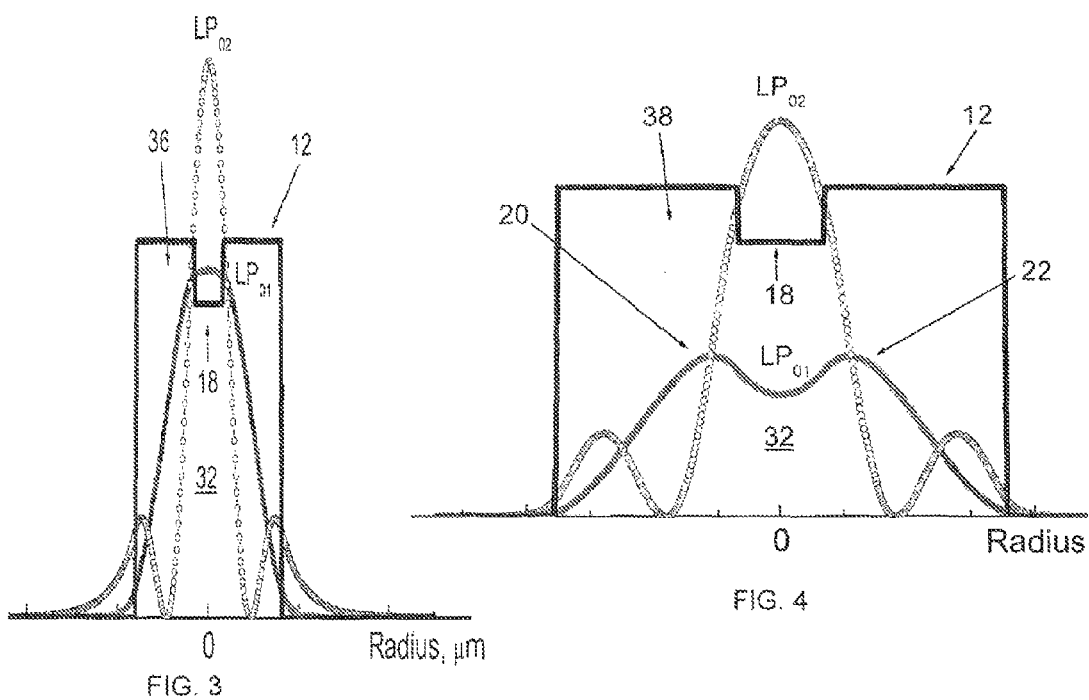
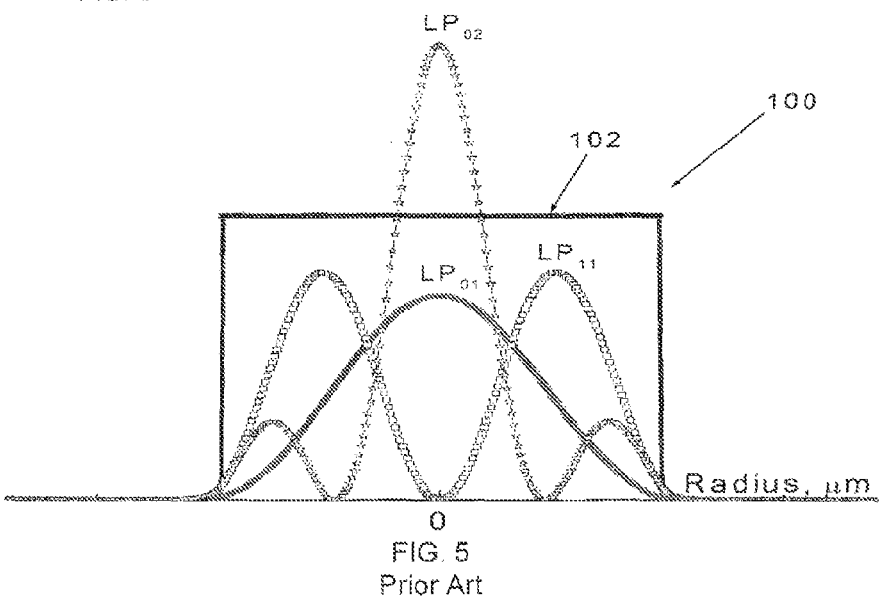
FIG. 5
Prior Art

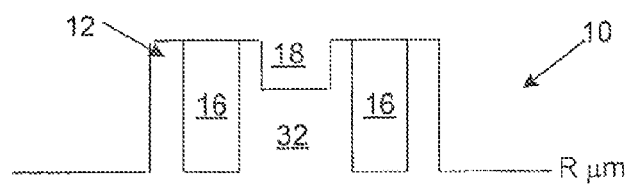
FIG. 6
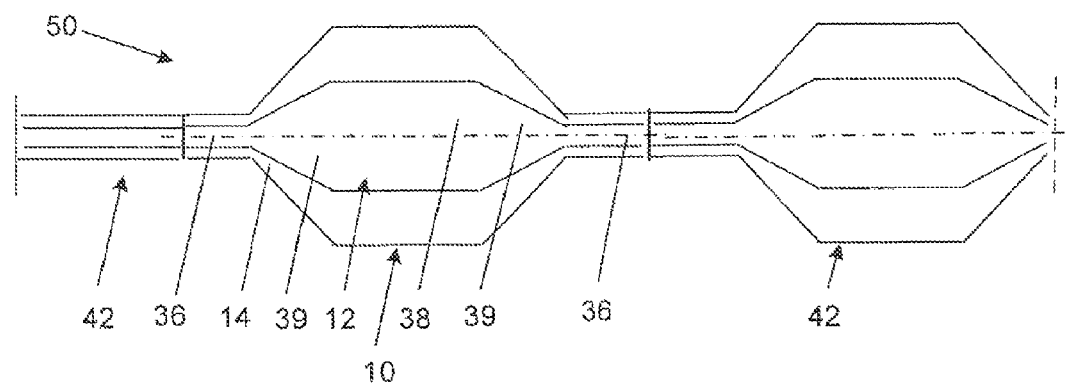
FIG. 7
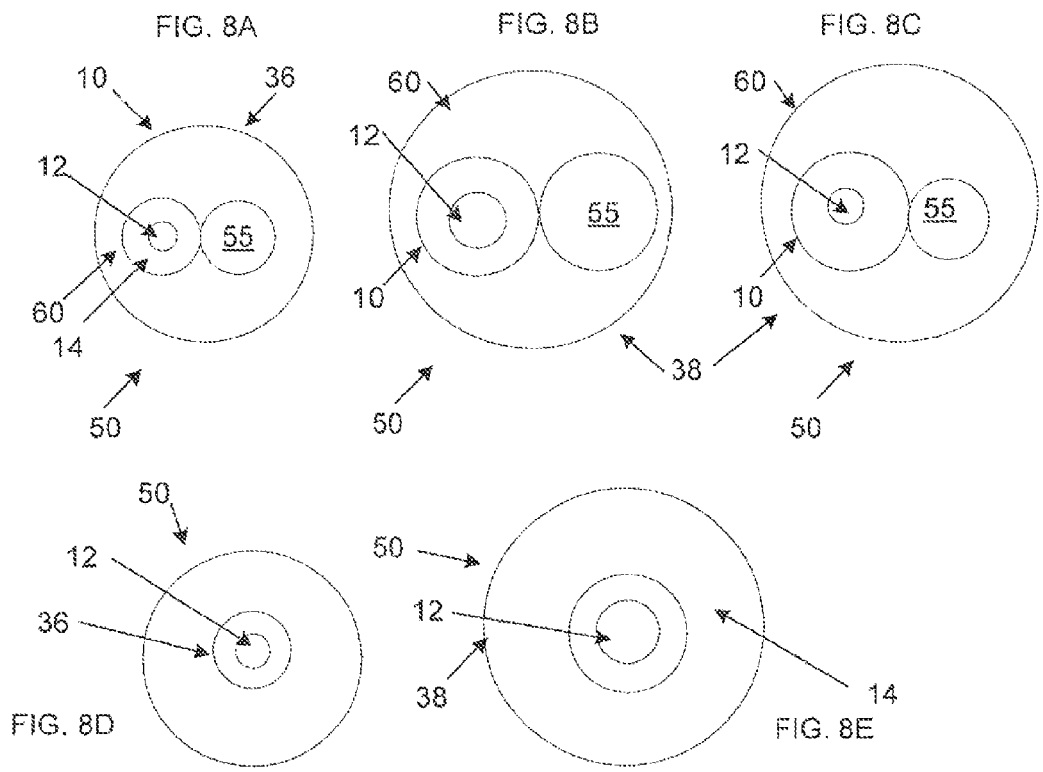

SINGLE MODE HIGH POWER FIBER LASER SYSTEM

CROSS-REFERENCE TO RELATED APPLICATION

This application is a division of U.S. patent application Ser. No. 12/559,284 filed with the U.S. Patent and Trademark Office on Sep. 14, 2009.

BACKGROUND OF THE DISCLOSURE

1. Technical Field

The disclosure relates to a fiber waveguide configured with a multimode (MM) fiber which has the geometry allowing for the excitation of substantially a fundamental mode at the input of the MM fiber and for guiding the excited fundamental mode without coupling thereof with high order modes.

2. Known Art Discussion

Numerous applications of fiber lasers are in need of a high-power, high-quality beam. Fiber lasers utilizing SM active fibers are limited in power due to the onset of optical nonlinearities. One common solution is the use a MM active fiber capable of supporting a few high-order modes (HOM) but configured to prevent the excitation and amplification of these HOMs.

Yet the power scaling of such MM fibers is also somewhat limited by the presence of nonlinearities including, but not limited to, Stimulated Raman Scattering (SRS). Perhaps one the most efficient practical approaches, leading to a relatively high optical nonlinearity threshold, is to decrease the power density inside the core of a MM fiber by increasing the core diameter, decreasing a numerical aperture and also decreasing the effective length of non-linear interaction. Unfortunately, this geometry is not easily attainable for the following reasons. First, the increase of the core diameter results in the increased number of HOMs which can be easily excited that detrimentally affects the quality of the output beam. Second, the manufacturing of high quality fibers with truly very low $\Delta n$ is highly challenging. Third, such fibers are sensitive to bending loads.

One of the techniques known to an artisan in the fiber laser art includes configuring the core of MM fiber with a dopant profile occupying the core's central region, as will be discussed in below. The centrally doped region effectively minimizes the excitation of peripheral non-zero azimuthal number HOMs, such as LP 11, which is traditionally considered as either originated at the input of MM fibers or as a result of mode coupling. However, the centrally doped region stimulates the excitation of centrally symmetrical HOMs with zero azimuthal number, such as LP02, at the input end of the MM fiber. The excited central modes, like any other excited HOMs, tend to extract the power from a fundamental mode and, thus, represent a serious problem.

A need, therefore, exists for a MM fiber configured with an axial cross section providing most favorable conditions for exciting substantially only a fundamental mode.

Another need exists for a MM fiber with a core configured with a refractive index which provides for the increased effective area of the excited fundamental mode and higher thresholds for nonlinearities that allow the MM fiber to output radiation on the order of tens of kW substantially concentrated in the fundamental mode.

Still another need exists for the MM fiber core with a dopant profile configured to gainguide substantially a fundamental mode $LP_{01}$ without coupling thereof with central symmetrical modes, such as $LP_{02}$.

Yet a further need exists for a high-power fiber laser system configured with the above described MM fiber amplifier which is configured to provide a substantial gain differential between fundamental and high order modes.

SUMMARY OF THE DISCLOSURE

All of the above specified needs are met by a MM fiber having a core centered on the longitudinal axis of the fiber and configured with a double bottleneck-shaped axial cross-section, and a controllably depressed region of refractive index which is centered along a core axis extending transversely to the longitudinal axis. Each of the features of the disclosed MM fiber amplifier addresses a respective one of the above-discussed characteristics of the known prior art and improves the characteristics of a substantially single-mode (SM) operation of the amplifier.

According to one aspect of the disclosure, the MM active fiber has a double bottleneck shape configured to minimize coupling losses at the opposite narrow opposite ends of the fiber. Typically, in high power fiber systems, an input SM beam is delivered by a SM passive fiber spliced to the input end of the MM active fiber. If the refractive index and core geometry of the respective fibers are different, i.e., mode field diameters (MFD) and shapes or profiles of respective single and fundamental modes do not match one another, the probability of HOM excitation is high. Accordingly, the relatively narrow input bottleneck-shaped end of the core is configured so that the MFDs and shapes of the respective input SM and excited fundamental mode substantially match.

Considering high powers on the order of tens of kW, a power density of light propagating along a standard, uniformly configured core is high and a threshold for nonlinearities is low. The presence of nonlinear effects is a limiting factor on high-power fiber laser or amplifier. Accordingly, the small end regions of the disclosed MM fiber are short enough for the origination of nonlinearities, whereas the central region of the fiber has an enlarged uniform diameter allowing, thus, for a reduced power density and, as a consequence, raised threshold for nonlinearities.

The transformer regions connecting respective opposite ends of the MM fiber amplifier and respective ends of the central region each have a frustoconical cross-section. Accordingly, the transformer regions are gradually expanding and gradually narrowing, respectively, along a light path. The geometry of the transformer regions thus allows for the expansion and compression of the excited fundamental mode which minimize coupling between the fundamental and HOMs along the path. Accordingly, since predominantly only a fundamental mode is excited at the input end, the disclosed shape of the MM fiber provides for the preservation and amplification of this mode so as to have a powerful output in the substantially fundamental mode.

A further aspect of the disclosure relates to a fiber configuration which, in addition to the double bottle-neck cross-section, contributes to a high threshold for nonlinearities. In particular, the disclosed MM fiber is configured to increase the mode field diameter of the excited fundamental mode and, therefore, to even further raise the threshold for nonlinearities.

The excited fundamental mode at the opposite ends of the MM fiber has a substantially Gaussian profile corresponding to the respective Gaussian profiles of the input and delivery SM passive fibers, respectively. The increase of the MFD of Gaussian-shaped fundamental mode is realized by the disclosed fiber with a refractive index profile providing for the transformation of the Gaussian profile into a ring or two-peak profile supported by the central, thick region of the MM active fiber. Structurally, this is attained by providing a dip within the central area of the refractive index profile. The dip is disclosed in U.S. Pat. Nos. 7,400,807 and 6,018,533 fully incorporated herein by reference.

The mismatch between the Gaussian and ring profiles of the fundamental mode is addressed by the geometry of the dip along the entire length of the disclosed MM fiber. To preserve the desired match between the MFDs and profiles of the respective single and fundamental modes of SM and MM fibers, respectively, at the opposite narrow ends of the disclosed fiber, the configuration of the dip is small enough to prevent the mode profile distortion. Accordingly, the spliced ends of the respective SM fibers and active MM all have a substantially Gaussian profile.

In contrast to the teaching of the above-mentioned patens, the width of the dip gradually increases along the expanding input transforming region of the MM fiber and reaches its maximal size, which corresponds to the ring profile of the fundamental, at the input of the central region. The greater the effective area of the mode, the higher the threshold for nonlinearities. The output transformer region is configured with the gradually decreasing width of the dip which is instrumental in the reverse transformation of the ring profile into a Gaussian profile. The latter has an MFD matching that one of the Gaussian profile of the SM delivery fiber. In summary, the above-disclosed active MM fiber amplifier minimizes the possibility of excitation and amplification of HOM at the splice region.

In a further aspect of the disclosure, the disclosed fiber MM fiber amplifier has a structure configured to provide a substantial gain to the fundamental mode, but prevent the amplification of central symmetrical modes, such as LP02. This is realized by providing a dopant profile having a ring-shaped cross-section, i.e., the ring-shaped dopant profile does not provide any gain within the central and peripheral regions of the refractive index. However, the ring-shaped dopant profile is configured so that it provides a significant gain in the regions of the core where the intensity profile of the fundamental mode has its peaks which are located between the central and peripheral core regions.

BRIEF DESCRIPTION OF THE DRAWINGS

These and other features, aspects and advantages of the present invention will become better understood with reference to the following description, appended claims, and accompanying drawings where:

FIG. 1 illustrates a MM active fiber having a double bottleneck-shaped cross section which is configured in accordance with the disclosure.

FIG. 2 illustrates the refractive index profile of the MM fiber of FIG. 1.

FIG. 3 illustrates the refractive index and intensity field profiles of respective central symmetric and fundamental modes along end regions of the disclosed MM fiber.

FIG. 4 illustrates the refractive index and intensity field profiles of respective central symmetric and fundamental modes along a central region of the MM fiber.

FIG. 5 illustrates index and mode profiles observed in a high power fiber system of the known prior art.

FIG. 6 illustrates the MM fiber of FIG. 1 provided with a refractive index profile which is configured with a dopant ring profile capable of providing gain guiding of predominantly a fundamental mode.

FIG. 7 illustrates a diagrammatic view of the disclosed MM fiber incorporated in a SM high power fiber laser system as a fiber amplifier and as a passive delivery fiber.

FIG. 8A illustrates a side pumping arrangement of SM fiber system incorporating the MM fiber of FIG. 1 and particularly showing a part of the pumping arrangement which extends along the end regions of the MM fiber.

FIG. 8B illustrates one embodiment of the side pumping arrangement along the central region of the MM fiber of FIG. 1.

FIG. 8C illustrates another embodiment of the side pumping arrangement along the central region of the MM fiber of FIG. 1.

FIGS. 8D and 8E illustrate an end pumping technique of the MM fibers of FIG. 1.

SPECIFIC DESCRIPTION

Reference will now be made in detail to the disclosed method of manufacturing specialty fibers, specialty fiber itself and high power fiber laser system incorporating the disclosed specialty fiber. Wherever possible, same or similar reference numerals are used in the drawings and the description to refer to the same or like parts. The drawings are in simplified form and far from precise scale.

In accordance with one aspect of the disclosure, a monolithic MM fiber is configured to provide the excitation of predominantly a fundamental mode at a given wavelength. The disclosed configuration of the MM fiber creating favorable conditions for excitation of substantially only the fundamental mode at the input end of the core and its undistorted propagation along the core is disclosed immediately below.

FIG. 1 illustrates a MM fiber 10 including a monolithic MM core 12 and at least one cladding 14. The cladding 14 may have a variety of configurations, and the shown one is merely an exemplary cross-section. The MM core 12 is configured in accordance with one of the aspects of the disclosure relating to a double bottleneck-shaped cross-section, if viewed along a longitudinal axis A-A'. Hence MM core 12 is structured with several regions including opposite input and output uniformly dimensioned end regions 36, a central region or amplifier 38 with a diameter which is larger than the diameter of end regions 36, and two frustoconical mode transformers 39 each located between the end and central regions 36, 38, respectively.

The end regions 36 each are substantially shorter than central region 38 and dimensioned so as to prevent the manifestation of nonlinear effects. The input end region 36 of core 12 is configured so that an MFD and field profile of fundamental mode, which is excited by a launched SM input, substantially match respective MFD and profile of the SM launched input. Particularly, both fundamental and SM modes have respective substantially Gaussian or dome-shaped field profiles with substantially matched MFDs. Similarly, the output end 36 of MM fiber 10 is configured to launch the output beam in the fundamental mode whose MFD and shape substantially match respective MFD and shape of a delivery SM fiber spliced to the output end of fiber 10.

The substantially matched MFDs and profiles of the respective fundamental and single modes prevent the excitation of HOMs at the input end region. Accordingly, if fiber 10 is configured as an active amplifying fiber, i.e., core 12 is doped with rare-earth elements, the excited mode is amplified along its path through core 12. In contrast, HOMs, if not excited at input end region 36, may not be amplified along fiber 10. Otherwise, if HOMs were amplified substantially to the degree of the amplification of the fundamental mode, the latter would experience power losses due to a so-called mode coupling. The fiber 10, of course, may be configured as a passive fiber having the same geometry as disclosed above without, however, the amplification function.

The enlarged core diameter of central amplifier 38 allows for better power handling characteristics, since the increased core diameter provides the decreased power density and, therefore, raises a threshold for nonlinearities, such as SRS. However, the increased core diameter is typically associated with the increased and highly undesirable possibility of HOMs' excitation. Accordingly, it is desirable to increase the MFD of fundamental mode $LP_{01}$ which would provide for a relatively high threshold for nonlinearities while minimizing the possibility of HOMs excitation.

As shown in FIG. 2 discussed in conjunction with FIG. 1, the increased MFD is realized by providing a central dip 18 in the refractive index profile of core 12. Generally a dip, which is rather a typical formation in MM fibers owing to the fabrication process, was traditionally considered responsible for the excitation of HOM modes and their coupling with the fundamental mode $LP_{01}$. In contrast to the known prior art, disclosed dip 18 is purposely and controllably enlarged along central region 38 for the following reasons.

The dip 18 is structured to transform the substantially Gaussian field profile of the excited fundamental mode at input region 36 into a larger, ring-shaped profile which overlaps the larger core area along central region 38 than an expanded Gaussian field profile. The larger the MFD of the fundamental mode, the higher the threshold for nonlinearities. However, the Gaussian and ring profiles obviously mismatch which is particularly troubling at opposite end regions 36 of MM fiber 10 since, typically, these end regions are spliced to respective SM input and delivery fibers.

The SM fibers are configured to support a single mode typically having a substantially Gaussian profile. If end regions 36 of MM fiber 10 were configured to support the ring profile of the fundamental mode, coupling losses of light power may be substantial. Hence, according to the disclosure, dip 18 is configured with a controllably changing configuration along MM fiber 10, as disclosed below.

FIG. 3, discussed in the context of FIG. 1, illustrates the disclosed refractive step-index of core 12 along end regions 36 provided with dip 18 configured so as to minimally distort the Gaussian mode of the excited fundamental mode. Preferably, the width of dip 18 along end regions 36 varies within a range between about $1\lambda$ and about $5\lambda$, where $\lambda$ is a given wavelength at which core 12 is capable of supporting substantially only the fundamental mode. As the fundamental mode continues to propagate along input transformer region 39, the Gaussian profile gradually transforms into a ring profile due to the gradual enlargement of dip 18. The larger the dip, the more ring-like the fundamental mode.

FIG. 4 illustrates the largest dimension of dip 18 associated with the articulated ring profile of fundamental mode LP01, which occurs when the latter enters central region 38 of MM fiber 10. The ring profile of fundamental mode $LP_{01}$ includes two energy peaks 20 and 22, respectively, and a centrally located valley bridging the peak regions. Accordingly, the ring profile spreads out occupying a greater area of core 12 than a Gaussian profile. The dip 18 may be realized by controllably doping the central region of core 12, preferably, with ions of fluoride. Alternatively, ions of boron may be used, but boron may have a few effects not considered here but making this element less advantageous than a controlled concentration of fluoride. Still another possibility is to controllably dope central region 32 with a concentration of phosphate different from that one in the peripheral regions of core 12. Rgrt In case of active fiber 10, core 12 is fully doped with one or more rare earth ions selected from the group consisting of Yb, Er, Nd, Tin, Pr, Ce and/or Ho ions and their combinations. The host material of core 12 may include silica, but preferably, the host material of the core includes phosphate. The latter is advantageous because the concentration of dopants in phosphate may be substantially higher than in silica without generating clusters, which lead to the degradation of waveguide. Typically, the generation of clusters in Si is observed when the concentration of ions, such as Yb, reaches about 1000-2000 ppm. In contrast, the phosphate host material allows for the rare-earth ion concentration of up to about 5000 ppm and higher Referring to FIGS. 3, 4 and 5, respectively, the advantages of disclosed fiber shown in FIGS. 3 and 4 over an exemplary standard MM fiber of the known prior art shown in FIG. 5 can be easily discern.

FIG. 5 illustrates refractive and intensity profiles of a uniformly dimensioned MM fiber 100. For many years, MM fibers, like MM fiber 100, were manufactured with an imperfect configuration, such as poor core-clad concentricity and core circularity. Accordingly, the fusion of fiber 10 with any SM fiber typically may result in excitation of respective. HOMs $LP_{11}$ and $LP_{02}$, which, among other HOMs, were most likely to be excited in a splice region. Occupying a peripheral core region, the $LP_{11O}$ is easily excited if the fiber is imperfect. Accordingly, the majority of known techniques are mostly concentrated on preventing or minimizing the excitation of this mode as disclosed in U.S. Pat. No. 5,818,630 ("US '630"). The excitation of symmetrical central modes including $LP_{02}$ is less explored, and many active fiber configurations, such as those with a centrally doped region of the US '630, even amplify central HOMs.

With the advent of fiber fabrication methods, the configuration of MM fiber, especially active fibers, tends to approach "ideal" characteristics including a core-clad concentricity<0.5 µm and core circularity>0.99. Furthermore, the splices between fused fibers also constantly improve. Accordingly, in these "ideal" fibers, non-symmetrical modes and most notably $LP_{11}$ mode may not be excited in a splice region and, therefore, at the input end region of "ideal" MM fibers due to the symmetry principle. Similarly, passive "ideal" fibers, when fused together, by and large, are also characterized by the excitation of only central symmetrical high order modes, such as $LP_{02}$.

Turning back to FIG. 3, the disclosed configuration of MM fiber 10, considered to have a substantially ideal configuration, illustrates the excited HOMs at the input end of MM fiber 10. As can be seen, substantially only central high order mode $LP_{02}$ is excited along with fundamental mode $LP_{01}$. Accordingly, the configuration of disclosed fiber 10 along central region 38 should be such that not only a further increase of intensity of this central HOM is prevented, but, desirably, the intensity thereof is somewhat decreased.

Referring to FIG. 4, it can be easily observed that the presence of dip 18 along fiber's region 28 minimizes the peak intensity of $LP_{02}$ in central core index region 32. Furthermore, the wings of fundamental mode $LP_{01}$ extract a lion's share of pump power leaving the wings of central HOM $LP_{02}$ practically without a gain. Note, however, that the enlargement of dip 18 is not limitless because a certain dip geometry would cause the intensity profile of $LP_{02}$ to assume a ring shape similar to one of fundamental mode $LP_{01}$. If such a transformation of the HOM $LP_{02}$ occurs, the disclosed configuration of dip 18, which results in the increased effective area of only the fundamental mode contributing, in turn, to even higher threshold for nonlinearities, ceases to provide the disclosed advantages.

Referring to FIG. 6 discussed in combination with FIGS. 3 and 4, while a combination of dip 18 and fully doped core 12 may lead to the desired result—substantially undistorted propagation of and amplification of fundamental mode $LP_{01}$—the active fiber may have different configurations capable of achieving the same results. Recent fiber designs have focused on tailoring the transverse profile of gain dopant do provide modal discrimination. For example, as mentioned above, one design includes a centrally doped region of core. This technique provides for an amplification of central HOM $LP02$ substantially equal to a gain experienced by fundamental mode $LP_{01}$ leading the energy loss in the fundamental mode at the output end of the MM fiber.

Accordingly, core 12 may be configured with a ring-doped region 16 that does not cover the entire core area. In particular, gain region or dopant profile 16 surrounds central region 32 of core 12 and terminates at a distance from the periphery of core 12. The gain region 16 is configured so as to include two power peak regions 20 and 22, respectively, of the fundamental mode seen in FIG. 4. As a result, the amplifications of these peak power regions provides a significant gain to the fundamental mode while the central HOMs, such as $LP_{02}$, experience no or insignificant gain.

Concentrating now on central region 32 of the refraction index profile of FIG. 6, intensity peaks of respective central HOMs, such as $LP_{02}$, remain in the center regardless of the presence of ring-shaped doped region 16. However, these peaks do not experience any gain. Hence, the peak of LP02, seen in FIG. 4, is not amplified which translates into a low intensity of this mode at the output end of MM fiber 10. Accordingly, in addition to a combination of double bottleneck cross-section of MM fiber 10 and controllably dimensioned dip 18, ring-shaped gain region 16 may further improve the output power of the fundamental mode.

The fiber 10 may be incorporated in both pulsed and CW configurations. Accordingly, the threshold for other nonlinear effects, such as self phase modulation, 4-wave mixing, SRS and SBS may be raised.

FIG. 7 diagrammatically illustrates an exemplary high power fiber laser system 50 including one or more gain blocks. Each gain block 50 is configured with disclosed continuous MM active fiber 10 fused at opposite ends 36 to respective SM passive fibers 42. The geometry of the output and input regions of respective passive fibers 42, each of which is coupled to end 36 of fiber 10, is configured so that an MFD and profile of SM light, which is supported by SM fibers, substantially match those of the fundamental mode of MM fiber 10. As a result, configuring continuous active fiber MM 10 with dip 18 (FIGS. 3, 4) and the double-bottleneck shape, in combination, not only minimizes coupling and insertion power losses, but also amplifies the fundamental mode. Since laser system 50 may handle high powers on the order of kW, SM passive fibers 42 each may also may have a double-bottleneck shape minimizing the occurrence of nonlinear effects in the passive delivery fiber 42 due to a relatively low power density within the large diameter region.

An exemplary version of system 50 may include Yb-doped MM active fiber 10 drawn to have outer diameters of respective opposite ends 36 each of 125 μm and central part or amplifier 38 of about 150-250 μm and the diameter of core 12 at end 36 of about 18 μm. Configuring passive fiber 42 with the end of about 125 μm and the desired mode field diameter, the fusion between MM fiber 10 and passive fiber 42 may be provided practically with minimal insertion losses.

FIGS. 8A-8C illustrate respective side pumping arrangements used in HP fiber laser systems which include active MM fiber 10. Preferably, pump delivery fiber 55 is operatively connected to cladding 14 of active MM fiber 10 along the substantial length of the latter. Accordingly, FIG. 8A illustrates the end portion of the side pumping arrangement which extends along end regions 36 of MM fiber 10. The attached fibers 10 and 55, respectively, are enveloped in a sleeve 60 made of material with a lower refractive index than cladding 14 so as to prevent coupling of pumped light out of fibers 10 and 55. Note that coupled fibers 10 and 55 have substantially the same outer diameter along the end region of FIG. 8A. FIG. 8B illustrates the central part of the side arrangement characterized by fibers 10 and 55 having substantially the same diameter, which is larger than the diameters of the input end of FIG. 8A. FIG. 8C also represents the coupling along the central region of the arrangement in which the outer diameter of pump delivery fiber 55 is substantially smaller than that one of MM fiber 10. The configuration shown in FIG. 8C is particularly advantageous because a substantial portion of pump radiance is absorbed in core 12 of MM fiber 10. FIGS. 8D and 8E illustrate respective configurations of the end pumping technique. The configuration of FIG. 8D includes coupling pump radiation into end region 36, whereas FIG. 8E illustrates the possibility of pumping central region 38, as discussed in a copending application No.

It will be apparent to those skilled in the art that various modifications and variations can be made in the presently disclosed laser powerful system. Thus, it is intended that the present disclosure cover the modifications and variations of this disclosure provided they come within the scope of the appended claims and their equivalents.

The invention claimed is:

1. An optical fiber extending along a longitudinal fiber axis and comprising" at least one cladding centered along the fiber axis; and an elongated multimode (MM) core concentric with and surrounded by the one cladding, the MM core being configured with a double bottleneck-shaped cross section so as to provide for excitation and doctorless guidance of substantially only fundamental mode wherein the double bottleneck-shape cross section of the MM includes: input and output mode transformer regions spaced axially from one another and each having a frustoconically-shaped cross-sections so that the transformer regions each have a relatively small end and relatively large end; and a uniformly dimensioned central region bridging the large ends of the respective input and output transformer regions; a uniformly dimensioned input end region running into the small end of the input transformer region, the input end region being configured so that substantially only the fundamental mode is excited therein in response to a single mode (SM) input beam launched into the input end region; a uniformly dimensioned output end region extending from the output transformer and receiving the fundamental mode therefrom so as to output a radiation in substantially the fundamental mode; wherein the MM core is configured with a refractive index step index profile having a centrally located dip, the SM input beam and the fundamental mode in the input end region having respective substantially Gaussian intensity profiles which are shaped with respective mode field diameters (MFD) substantially matching one another; wherein the dip gradually enlarges along the input transformer region so as to transform the profile into a ring profile of the fundamental mode coupled into the central region of the core and narrows along the output transformer region towards the output end region of the core so as to transform the ring profile of the fundamental mode into the substantially Gaussian profile thereof.

2. The fiber of claim 1, wherein the input and output end regions each have a length varying between about $1\lambda$ and about $5\lambda$, where $\lambda$ is a given wavelength at which the MM core supports substantially only the fundamental mode.

3. The fiber of claim 1, wherein the dip, extending along the central region, is configured with a uniform width.

4. The fiber of claim 3, wherein the ring profile of the fundamental mode is shaped with two power peak regions spaced equidistantly from an axis of symmetry of the refractive step index of the core and a valley which is centered on the symmetry axis and bridges the peak power regions.

5. The fiber of claim 4, wherein the core is configured with a doped ring-shaped region spaced from the axis of symmetry and terminating at a distance from a periphery of the refractive step index, the doped region providing a gain to the peak power regions of the fundamental mode without amplification of central and peripheral HOMs.

6. The fiber of claim 1, wherein the MM core is configured with a dopant concentration area or without the dopant concentration area.

\* \* \* \* \*